United States Patent
Ogi et al.

(10) Patent No.: US 6,563,104 B2
(45) Date of Patent: May 13, 2003

(54) IMAGE FORMING APPARATUS

(75) Inventors: Shuya Ogi, Osaka (JP); Koichiro Iki, Osaka (JP); Minoru Toyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 131 days.

(21) Appl. No.: 09/898,030

(22) Filed: Jul. 5, 2001

(65) Prior Publication Data
US 2002/0036255 A1 Mar. 28, 2002

(30) Foreign Application Priority Data
Jul. 7, 2000 (JP) ........................................ 2000-207380

(51) Int. Cl.$^7$ .............................................. H01L 27/00
(52) U.S. Cl. ................. 250/208.1; 250/227.2; 347/137
(58) Field of Search ................... 250/208.1, 227.2, 250/227.11, 227.26, 216, 235, 236; 358/474, 475; 347/137, 258, 256; 359/652–654

(56) References Cited

U.S. PATENT DOCUMENTS 5,933,181 A * 8/1999 Yukihiko 6,469,837 B2 * 10/2002 Toyama ............... 359/652

FOREIGN PATENT DOCUMENTS

| DE | 3438949 | * 10/1984 |
| EP | 01243004 | * 9/1989 |
| EP | 02096541 | 4/1990 |
| EP | 04170880 | * 6/1992 |
| EP | 05237860 | * 9/1993 |
| EP | 04087567 | * 10/1993 |

* cited by examiner

Primary Examiner—Que T. Le
(74) Attorney, Agent, or Firm—Whitham, Curtis & Christofferson, PC

(57) ABSTRACT

In an image forming apparatus, an object surface (14) is disposed facing one end face of a rod lens array (10), while an image surface (16) is disposed facing the other end face thereof. A lens working distance of the rod lens array on the object side is substantially equal to that on the image side. An actual object-image distance Tco is set between the conjugate length TC1 at which the average value MTFave of the MTF of the rod lens array in the lens array direction is maximized and the conjugate length TC2 at which the $\Delta$MTF(=(MTFmax−MTFmin)/MTFave) is minimized, and a shift quantity $\Delta$TC(=|TCo−TC1|) is set within 0 mm<$\Delta$TC<+02 mm for the conjugate length TC1 at which the MTFave is maximized.

6 Claims, 4 Drawing Sheets

14: OBJECT SURFACE
10
12
Lo
Zo
Lo
TC
16: IMAGE SURFACE

PLATEN GLASS SURFACE
14: OBJECT SURFACE (ORIGINAL DOCUMENT SURFACE)
LIGHT INTRODUCING MEMBER
10
HOUSING
16: IMAGE SURFACE (SENSOR PIXEL CONTAINED SURFACE)
LIGHT SCATTERING PATTERN

IMAGE FORMING APPARATUS

BACKGROUND OF THE INVENTION

The present invention relates to an image forming apparatus using a rod lens array. More particularly, the invention relates to an image forming apparatus which secures uniformity of resolution while retaining its fundamental resolving power by disposing an object surface and an image surface at appropriate positions. This technique is useful when it is applied to a contact image sensor or an LED printer.

As shown in FIG. 1, a rod lens array 10 is constructed as an unit magnification imaging optical system in which a number of rod lenses 12 each having a refractive index distribution in the radial direction are arrayed such that their optical axes are arranged parallel to one another. The unit magnification imaging optical system is widely employed in facsimile equipment, copying machines, scanners, LED printers and the like. An object surface 14 is disposed facing one end faces of the rod lenses 12, and an image surface 16 is disposed facing the other end faces thereof. In an image reading system, such as a contact image sensor shown in FIG. 2, the object surface 14 is an original document surface and the image surface 16 is a sensor pixel contained surface. In an image writing system, such as an LED printer, the object surface is a light emitting surface of the LED elements, and the image surface is a drum surface.

In designing an optical position relationship in those image forming apparatuses, it is essential to set an average value MTFave of the MTF (modulation transfer function) at the largest possible value. The average value MTFave is an average value of the MTF as calculated in the lens array direction (=longitudinal direction of the rod lens array). Incidentally, the MTF indicates a fundamental resolving power of the rod lens array. To this end, the object surface 14 and the image surface 16 are positioned so as to satisfy at least the following condition: a lens working distance Lo on the object side (=distance from one lens end face to the object surface) is optically equal to a lens working distance Lo on the image side (=distance from the other lens end face to the image surface). Another approach, sometimes employed, is to adjust a distance TC between the object surface and the image surface (referred to as an object-image distance TC) so as to maximize the average value MTFave of the MTF.

The MTF is given by the following equation:

$$MTF(\%)=[(i\max-i\min)/(i\max+i\min)]\times 100$$

In the above equation, the terms imax and imin are obtained in the following manner. As shown in FIG. 3, a rod lens array 10 receives a rectangular grating pattern (=original image) 20, and forms an image 22 of the pattern. A sensor receives the image 22. The relative maximum imax and the relative minimum imin of a light amount of the received image 22 are measured. It is evaluated that as the MTF is closer to 100%, an image formed by the optical system more accurately resembles an original image (the resolving power of the optical system is larger).

The actual measurement is conducted using an optical system as shown in FIG. 4. In the figure, light emitted from a light source 30 such as a halogen lamp passes through a filter 31, a diffusion plate 32, and a rectangular test chart 33. As a result, a rectangular grating pattern is formed. The rod lens array 10 forms an image of the rectangular grating pattern. A CCD image sensor 34 receives the image and transforms it into a corresponding electrical signal. The rod lens array 10 is moved in the direction of a void arrow. Through the movement of the rod lens array, the image is inspected over the entire length thereof. A waveform of an output signal of the CCD image sensor 34 is output to a data processor 35. The data processor 35 appropriately processes the output waveform to have the relative maximum imax and the relative minimum imin of the waveform, and computes the MTF by using them. An average value of the MTF as computed in the lens array direction is the MTFave of the lens array.

In addition to the approach to adjust the object-image distance TC so as to maximize the average value MTFave of the MTF, there is another approach. For example, in an image reading system, if the presence of a platen glass can restrict a position deviation of an original document in only one direction, an optimum focus position on the object surface side is offset away from the platen glass surface, in order to increase an apparent focal depth. This approach is so-called a one-side offset arrangement. In yet another approach, an image writing system can employ a defocused positional relationship in order to lessen the adverse influence of the variations in the light emissions of the LED elements.

In the rod lens, the resolution is distributed in the radial direction within a visual field. Consequently, an image superimposed by the rod lens array contains the resolution fluctuation in the longitudinal direction at a cycle of the lens radius (when the sensor pixel/LED element is aligned with the center position of the lens array) or at a cycle of the lens diameter (when the sensor pixel/LED element is not aligned with the center position of the lens array). If the rod lens array currently marketed is used at the resolution power of 600 dip or higher, this resolution fluctuation is not negligible.

Recent higher resolution tendency of applications causes a fact that the conventional technique cannot secure uniformity of the resolution while retaining its fundamental resolving power. In handling the half-tone image used in the image reading/writing system, the optical density non-uniformity frequently occurs.

SUMMARY OF THE INVENTION

Accordingly, an object of the present invention is to provide an image forming apparatus which secures uniformity of resolution in the lens array direction, while retaining the fundamental resolving power, and hence lessens the optical density non-uniformity to be negligible even in handling the half-tone image.

According to the present invention, there is provided an image forming apparatus which uses an unit magnification imaging rod lens array including a number of rod lenses each having a refractive index distribution in the radial direction and being arrayed such that their optical axes are arranged parallel to one another, and in which an object surface is disposed facing one end face of a rod lens array, while an image surface is disposed facing the other end face thereof, and a lens working distance of the rod lens array on the object side is substantially equal to that on the image side. The image forming apparatus is improved such that an actual object-image distance Tco is set between the conjugate length TC1 at which the average value MTFave of the MTF of the rod lens array in the lens array direction is maximized and the conjugate length TC2 at which the ΔMTF(=(MTFmax−MTFmin)/MTFave) is minimized, or the actual object-image distance Tco is equal to the conjugate length TC2 at which the ΔMTF is minimized and a shift quantity $\Delta TC(=|TCo-TC1|)$ is set within 0 mm$<\Delta TC<+0.2$ mm with respect to the conjugate length TC1 at which the MTFave is maximized. In the image forming apparatus, it is more preferable that the object-image distance Tco is set within +0.05 mm$<\Delta TC<+0.15$ mm.

The inventors of the present patent application studied such a phenomenon that when the half-tone image is used at high resolution, the optical density non-uniformity is noticeable, and reached the following conclusion. Through the study, the following facts were found: 1) It is convenient to use a new parameter $\Delta$MTF in evaluating the optical density non-uniformity, and 2) Generally, a conjugate length TC1 at which the average value MTFave of the MTF in the lens array direction (longitudinal direction) is maximized is not equal to a conjugate length TC2 at which $\Delta$MTF is minimized.

As described above, in the invention, the actual object-image distance Tco is set between the conjugate length TC1 at which the average value MTFave of the MTF of the rod lens array in the lens array direction is maximized and the conjugate length TC2 at which the $\Delta$MTF(=(MTFmax−MTFmin)/MTFave) is minimized, or the actual object-image distance Tco is equal to the conjugate length TC2 at which the $\Delta$MTF is minimized and a shift quantity $\Delta TC(=|TCo-TC1|)$ is set within 0 mm$<\Delta TC<+0.2$ mm with respect to the conjugate length TC1 at which the MTFave is maximized. A direction in which the conjugate length TC2 at which $\Delta$MTF is minimized is shifted with respect to the conjugate length TC1 at which the MTFave is maximized, is determined by a refractive index distribution coefficient of the rod lens and the like (the direction: + direction in which the conjugate length increases or − direction in which it decreases). Accordingly, in the invention, it is important that the actual object-image distance Tco is set between the conjugate length TC1 at which the average value MTFave of the MTF of the rod lens array in the lens array direction is maximized and the conjugate length TC2 at which the $\Delta$MTF is minimized. Further, in the invention, the lens working distance of the rod lens array on the object side is substantially equal to that on the image side. Accordingly, an optical shift quantity on each of the object side and the image side is $\Delta TC/2$. Because of this, the decrease of the average value MTFave of the MTF is within a tolerable range. The uniformity of resolution in the lens array direction is secured while sustaining the high resolving power. Accordingly, the optical density non-uniformity is negligible even in handling the half-tone image.

The present disclosure relates to the subject matter contained in Japanese patent application No. 2000-207380 (filed on Jul. 7, 2000), which is expressly incorporated herein by reference in its entirety.

DESCRIPTION OF THE PREFERRED EMBODIMENT

The MTF of a rod lens array having design specifications given below was calculated in the longitudinal direction (lens element array direction) for different higher order refractive index distribution coefficients. The calculation result is shown in FIG. 5. In the calculation, a 24 lp/mm (lp/mm=line pair/mm) pattern was used, and the MTFave and $\Delta$MTF were calculated on the object-image distance TC. The design specifications of a basic rod lens array are:

Rod lens diameter D: 0.563 mm

Conjugate length TC1 providing the maximal MTFave: 9.9 mm

Rod lens length Zo: 4.34 mm

Angular aperture (Maximum incident angle) $\Theta$o: 20°

A refractive index distribution of the rod lens is given by $$n(r)^2 = n_o^2 \cdot \{1 - (g \cdot r)^2 + h_4(g \cdot r)^4 + h_6(g \cdot r)^6 + h_8(g \cdot r)^8\}$$

where r: distance radially measured from the optical axis of the rod lens no: refractive index (=1.625) on the optical axis of the rod lens g: refractive index distribution coefficient (=0.8423) h4, h6, h8: higher order refractive index distribution coefficient The higher order refractive index distribution coefficients in cases A to D in FIG. 5 are as tabulated in Table 1.

TABLE 1

| Case | h4 | h6 | h8 |
|------|------|-----|-----|
| A | 1.50 | −25 | 175 |
| B | 1.50 | −27 | 200 |
| C | 1.50 | −22 | 200 |
| D | 1.40 | −25 | 200 |

In any of the cases A to D in FIG. 5, the conjugate length TC1 at which the average value MTFave of the MTF of the rod lens array in the lens array direction is maximized, is not equal to the conjugate length TC2 at which $\Delta$MTF(AMTF=(MTFmax−MTFmin)/MTFave) is minimized. The difference between those lengths is shifted to the right or left (in the direction in which the object-image distance increases or decreases). Accordingly, if an actual object-image distance Tco is set between the conjugate length TC1 at which the average value MTFave of the MTF of the rod lens array in the lens array direction is maximized and the conjugate length TC2 at which the $\Delta$MTF is minimized or if it is equal to the conjugate length TC2 at which the $\Delta$MTF is minimized and is set for the conjugate length TC1 at which the MTFave is maximized such that a shift quantity $\Delta TC(=|TCo-TC1|)$ is within 0 mm$<\Delta TC<+0.2$ mm, it is put within a tolerable range within which the decrease of the average value of the MTF is allowed. Therefore, a high fundamental resolving power is sustained and uniformity of resolution in the lens array direction is secured. Accordingly, the optical density non-uniformity is negligible even when the half-tone image is handled. Particularly when the shift quantity $\Delta TC$ is set within a range +0.05 mm$\leq \Delta TC \leq +0.15$ mm, the MTFave is high and $\Delta$MTF is low. That is, good results are obtained.

Figure 6:
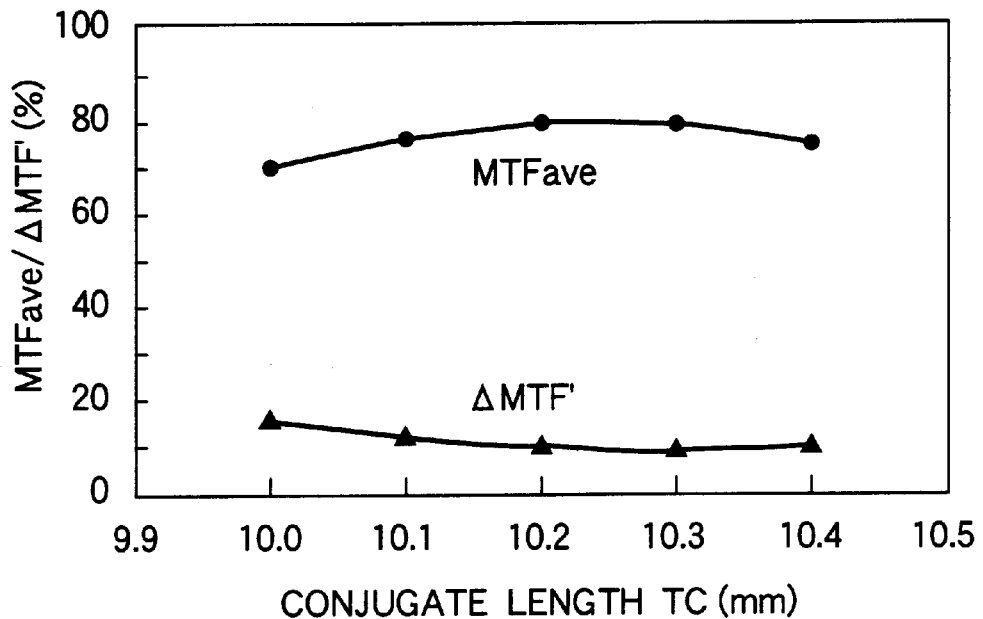
FIG. 6 is a graph showing the results of an actual measurement of the rod lens array.

FIG. 6 is a graph showing variations of the average value MTFave of the MTF and $\Delta$MTF' as measured by using the rod lens array specified on the basis of the simulation. In the measurement, the MTF full width profile at 12 lp/mm is actually measured. Variations of the average value MTFave of the MTF and $\Delta$MTF' were obtained on the basis of the MTF full width profile. The ΔMTF' is mathematically defined as $$\Delta MTF'(MTFave-MTFmin)/MTFave$$

The ΔMTF' takes a minimum value, 10.3 mm, at the position where ΔTC=0.1 mm with respect to the conjugate length TC1 providing the maximal MTFave (10.2 mm).

Figure 1:
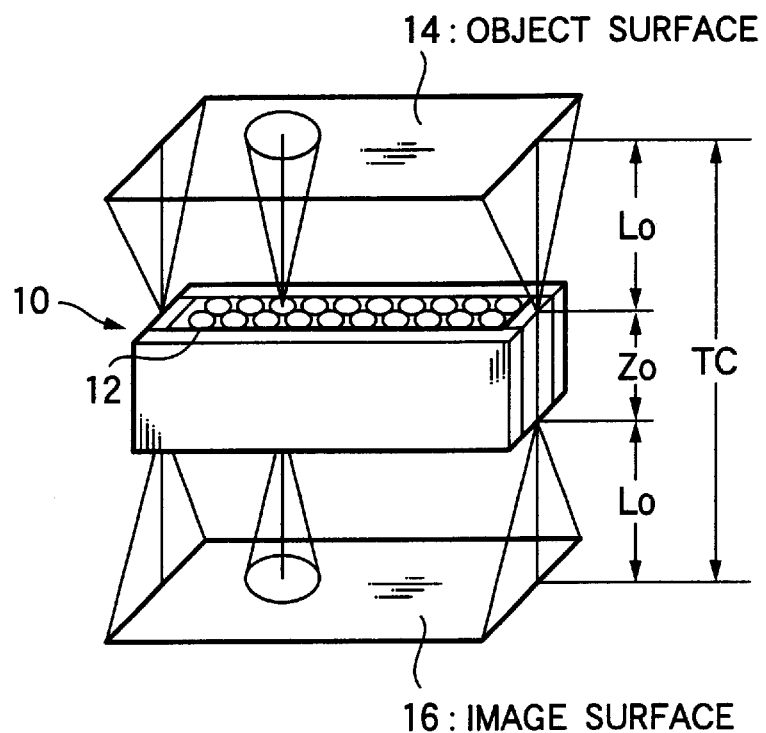
FIG. 1 is an explanatory diagram showing an image forming apparatus using a rod lens array.
Figure 2:
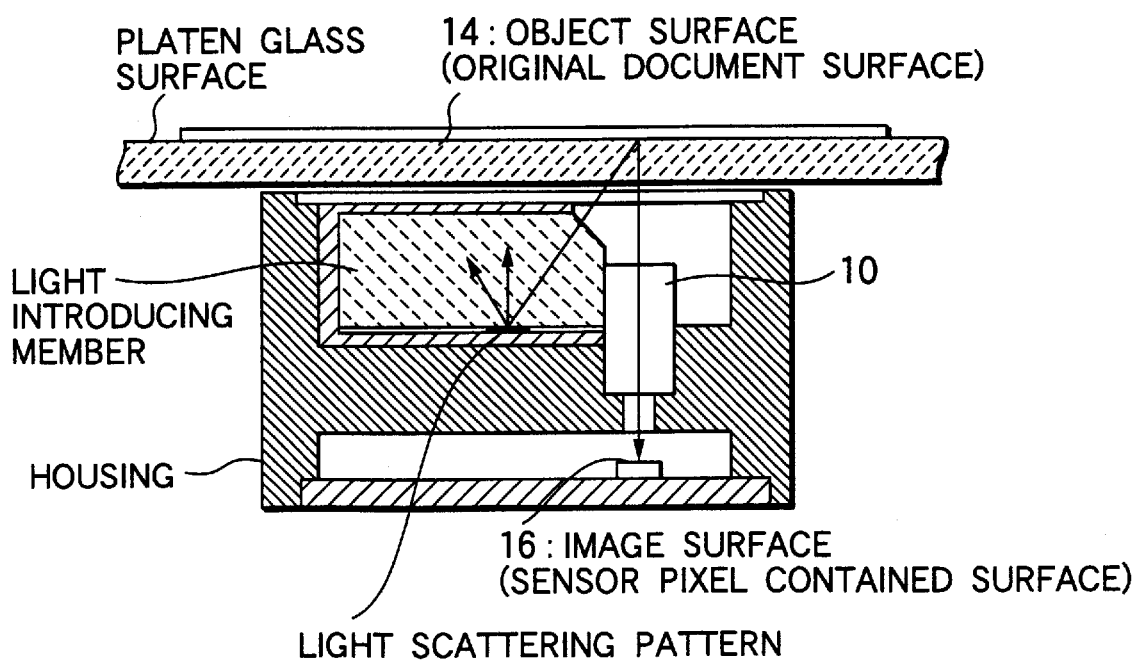
FIG. 2 is an explanatory diagram showing a contact image sensor.
Figure 3A:
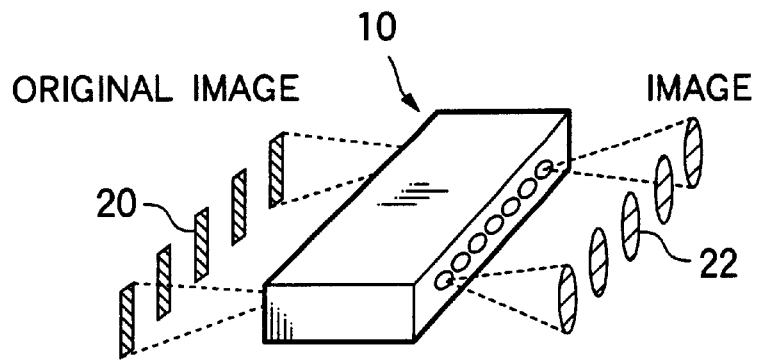
FIG. 3 is an explanatory diagram showing the MTF.
Figure 3B:
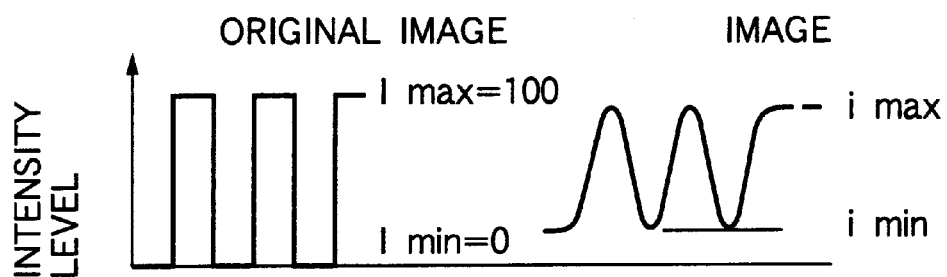
Figure 4:
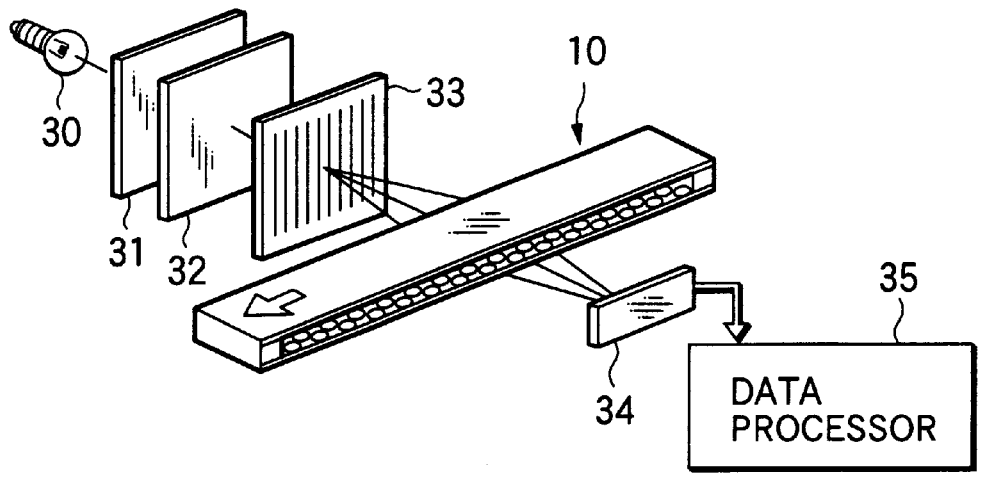
FIG. 4 is an explanatory diagram showing an optical system for measuring the MTF.
Figure 5A:
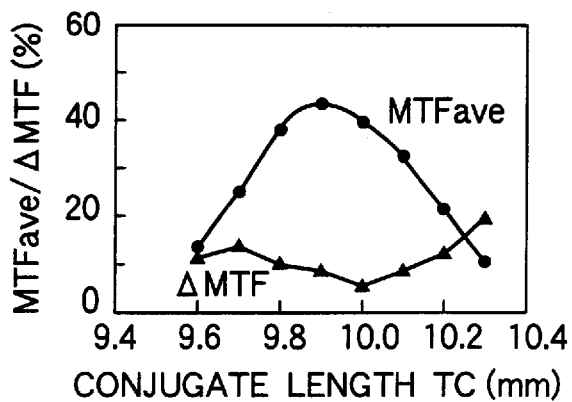
FIG. 5 is a graph showing the results of a simulation of an example of a rod lens array.
Figure 5B:
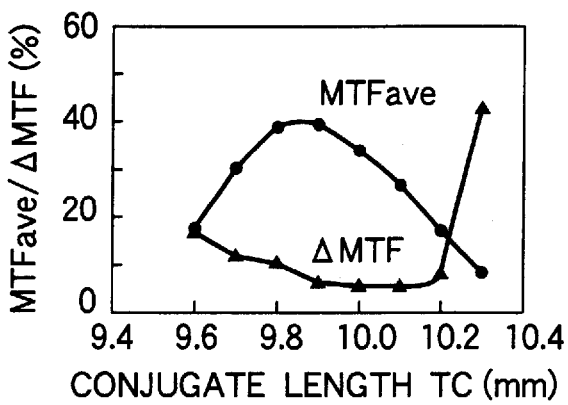
Figure 5C:
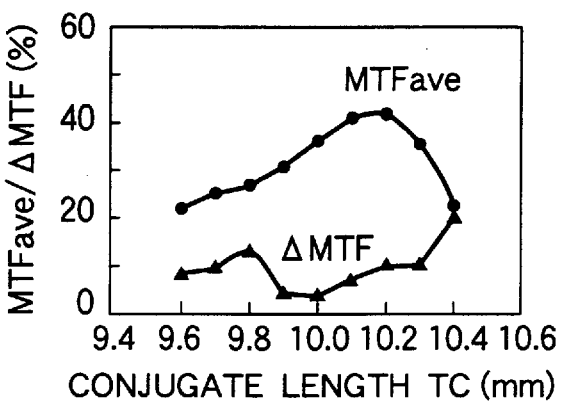
Figure 5D:
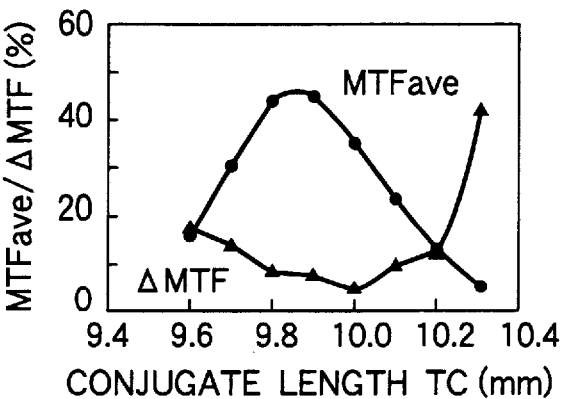
Figure 7:
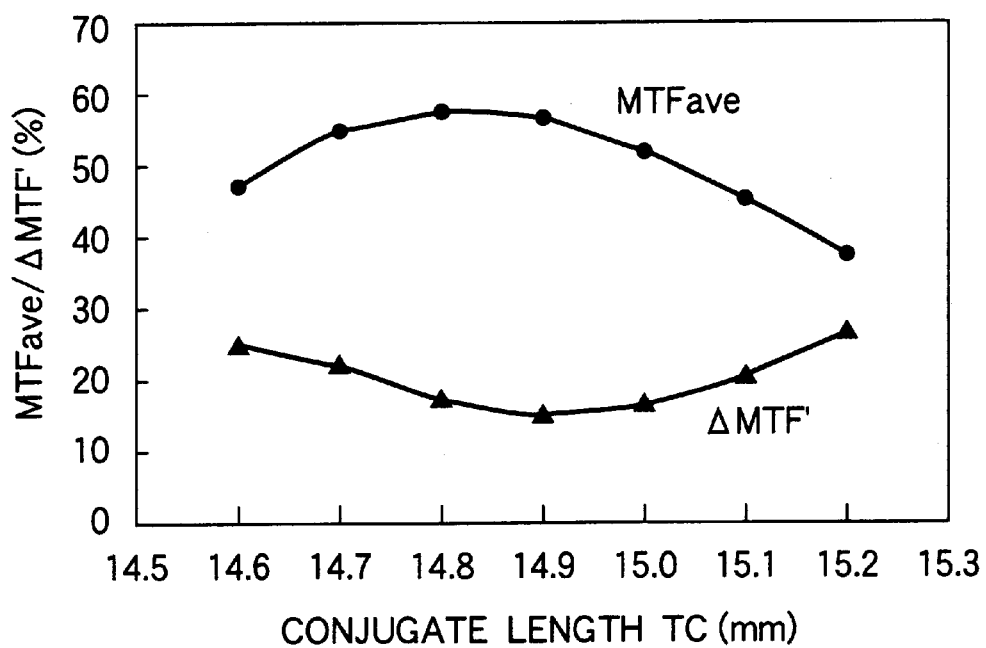
FIG. 7 is a graph showing the results of an actual measurement of another rod lens array.

Variations of the average value MTFave of the MTF and ΔMTF' of a rod lens array specified as below were calculated. To this end, the optical system shown in FIG. 4 was used. The MTF full width profile at 12 lp/mm was measured for various object-image distances TC. The calculation results are shown in FIG. 7.

Rod lens diameter D: 0.912 mm
Conjugate length TC1 providing the maximal MTFave: 15.1 mm
Rod lens length Zo: 6.89 mm
Angular aperture (maximum incident angle) Θo: 20°
Refractive index no: 1.627
Refractive index distribution coefficient g: 0.5348

The ΔMTF' takes a minimum value, 14.9 mm, at the position where ΔTC=0.1 mm with respect to the conjugate length TC1 providing the maximal MTFave (=14.8 mm).

As seen from the foregoing description, in the image forming apparatus of the invention, an actual object-image distance Tco is set between the conjugate length TC1 at which the average value MTFave of the MTF of the rod lens array in the lens array direction is maximized and the conjugate length TC2 at which the ΔMTF is minimized or it is equal to the conjugate length TC2 at which the ΔMTF and is minimized is set for the conjugate length TC1 at which the MTFave is maximized such that a shift quantity ΔTC(=|TCo−TC1|) is within 0 mm<ΔTC<+02 mm. Accordingly, the average value MTFave is not decreased and the ΔMTF is suppressed. Therefore, the present invention succeeds in providing an image forming apparatus with less variation of the resolution in the longitudinal direction without greatly decreasing the fundamental resolving power. Particularly when the shift quantity ΔTC is set within a range of +0.05 mm≦ΔTC≦+0.15 mm, a good characteristic where the average value MTFave and the ΔMTF are well balanced is obtained.

What is claimed is:

1. An image forming apparatus which uses an unit magnification imaging rod lens array including a number of rod lenses each having a refractive index distribution in the radial direction and being arrayed such that their optical axes are arranged parallel to one another, and in which an object surface is disposed facing one end face of the rod lens array, while an image surface is disposed facing the other end face thereof, and a lens working distance of the rod lens array on the object side is substantially equal to that on the image side, wherein an actual object-image distance Tco is set between a conjugate length TC1 at which an average value MTFave of MTF of the rod lens array in the lens array direction is maximized and a conjugate length TC2 at which ΔMTF(=(MTFmax−MTFmin)/MTFave) is minimized.

2. The image forming apparatus according to claim 1, wherein said actual object-image distance Tco is equal to the conjugate length TC2 at which the ΔMTF is minimized and set, with respect to the conjugate length TC1 at which the MTFave is maximized, such that a shift quantity ΔTC(=|TCo−TC1|) is set within 0 mm<ΔTC<+0.2 mm.

3. The image forming apparatus according to claim 2, wherein said actual object-image distance Tco is set, with respect to the conjugate length TC1 at which the MTFave is maximized, such that the shift quantity ΔTC(=|TCo−TC1|) is within +0.05 mm<ΔTC<+0.15 mm.

4. An image forming apparatus which uses an unit magnification imaging rod lens array including a number of rod lenses each having a refractive index distribution in the radial direction and being arrayed such that their optical axes are arranged parallel to one another, and in which an object surface is disposed facing one end face of the rod lens array, while an image surface is disposed facing the other end face thereof, and a lens working distance of the rod lens array on the object side is substantially equal to that on the image side, wherein an actual object-image distance Tco is equal to a conjugate length TC2 at which ΔMTF(=(MTFmax−MTFmin)/MTFave) is minimized and set, with respect to a conjugate length TC1 at which the MTFave is maximized, such that a shift quantity ΔTC(=|TCo−TC1|) is set within 0 mm<ΔTC<+0.2 mm.

5. The image forming apparatus according to claim 4, wherein said actual object-image distance TCo is set, with respect to the conjugate length TC1 at which the MTFave is maximized, such that the shift quantity ΔTC(=|TCo−TC1|) is within +0.05 mm<ΔTC<+0.15 mm.

6. An image forming apparatus comprising:
a rod lens array in which gradient index rod lenses are arrayed so that their optical axes are parallel to one another, the rod lens array having a characteristic of defining a first conjugate length TC1 at which an average value MTFave of MTF in the lens array direction is maximized and a second conjugate length TC2 at which ΔMTF(=(MTFmax−MTFmin)/MTFave) is minimized;
an object surface facing one end face of the rod lens array; and
an image surface facing the other end face of the rod lens array, and being disposed so that:
a distance TCo between the object surface and the image surface falls within a range between the first conjugate length TC1 and the second conjugate length TC2, or
the distance TCo is substantially equal to the second conjugate length TC2 and offset from the first conjugate length TC1 by a predetermined shift quantity ΔTC(=|TCo−TC1|) falling within a range of 0 mm to +0.2 mm.

* * * * *